Figure 1:
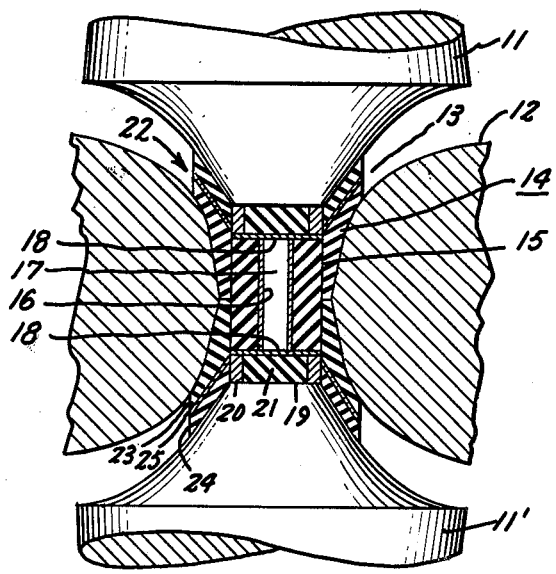

June 9, 1964  H. P. BOVENKERK ETAL  3,136,615
COMPACT OF ABRASIVE CRYSTALLINE MATERIAL
WITH BORON CARBIDE BONDING MEDIUM
Filed Oct. 3, 1960

Inventors:
Harold P. Bovenkerk,
Robert H. Wentorf,
Robert H. Savage,
by James J. Lickiello
Their Attorney.

United States Patent Office 3,136,615
Patented June 9, 1964

3,136,615
COMPACT OF ABRASIVE CRYSTALLINE MATERIAL WITH BORON CARBIDE BONDING MEDIUM
Harold P. Bovenkerk, Royal Oak, Mich., and Robert H. Wentorf, Jr., Schenectady, and Robert H. Savage, Scotia, N.Y., assignors to General Electric Company, a corporation of New York
Filed Oct. 3, 1960, Ser. No. 60,044
3 Claims. (Cl. 51—307)

This invention relates to a method of bonding or joining very hard crystals together, and more particularly, to a plurality of small diamond, cubic form of boron nitride, and other similar crystals bonded by a specific bonding medium into a compact.

Present large sized diamond cutting and grinding tools generally utilize a plurality of small diamond crystals or diamond powder, each term being synonymous whether the crystals are integral or crushed. In these tools, such as for example, wheels, cutting devices, saws, grinding elements, etc., diamonds are either individually mounted in a holder, or are embedded or otherwise distributed throughout a suitable matrix and the matrix joined to a holder. Ordinarily, the feature of individually mounting small diamond crystals in a holder is restricted to those operations where only a small amount of diamonds will provide the necessary results or where larger crystals or plural operations are desired. The greater majority of tools utlize a diamond powder or small particle diamond dispersed in a suitable matrix because of the wide cutting area thus obtained, because of economy in purchasing powder or small particle diamond, because individually mounted diamonds represent specific problems in obtaining a good bond between the diamond and the holder, and breakage of a single large diamond crystal represents a large investment loss.

In the matrix diamond tool, the matrix may be a part or portion of the tool holder or the entire assembly may be manufactured in or on the holder. For example, a metal cup-like member may be filled with a mixture of diamond particles and a matrix and after suitable bonding operation of the diamonds, matrix and cup, the cup member is joined to a holder. A plurality of diamond crystals, in whole or in part, suitably bonded by a bonding medium to form a large, integral, tough, coherent, high strength mass is hereinafter referred to as a compact or diamond compact and comprises basically a matrix with a plurality of diamond crystals embedded or dispersed therein with no particular configuration. Such a compact is a very useful tool, because it makes use of diamond crystals which are very small and far more economical than larger crystals. More advantageous, however, is the fact that these diamond crystals are randomly oriented in the compact to present plural faces to the work surface and when wearing, or when diamonds become detached from the matrix, there remain many crystals engaging the work surface. Additionally, as the matrix wears away, there are exposed more new diamond crystal faces. However, the matrix, being the less hard material, wears away and is the limiting factor in such a tool. The cubic form of boron nitride is also a material which may be employed similarly to diamond and is desirable in the same manner.

Accordingly, the object of this invention is to provide an improved compact.

It is another object of this invention to provide a better bond between diamond crystals and cubic form of boron nitride crystals.

It is a further object of this invention to provide an improved matrix material for diamond and cubic form of boron nitride compact use.

It is yet another object of this invention to provide a hard crystal compact with minimum bonding medium.

It is another object of this invention to provide a compact utilizing boron carbide as a bonding material.

Briefly described, this invention includes mixing of a plurality of small particle or powdered diamond or cubic form of boron nitride or both together with small particle or powdered boron carbide and subjecting the resulting mixture to a combination of high pressures and high temperatures to provide a tough, coherent, cemented compact.

Figure 2:
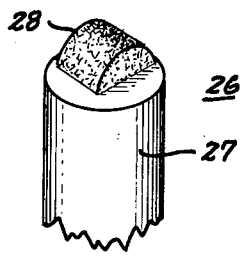

This invention will be better understood when taken in connection with the following figures and the drawing in which:

FIG. 1 s a partial sectional view of one exemplary high pressure high temperature apparatus utilized in accordance with the teachings of this invention; and FIG. 2 illustrates basically an abrading tool having a sintered boron carbide diamond or cubic form of boron nitride matrix compact mounted therein.

Referring now to FIG. 1, there is illustrated a well known form of high pressure high temperature apparatus described as a belt and the subject of U.S. Patent 2,941,248, Hall. Briefly described, this apparatus 10 includes a pair of punches 11 and 11' and an intermediate belt or die 12. Each punch is surrounded by a plurality of press-fitted hard steel binding rings and an outer soft steel safety ring (not shown) to increase the strength of the punches. Die 12 also is assembled in the same manner and includes an aperture or opening 13 to receive a reaction vessel 14.

Reaction vessel 14 in preferred form includes a hollow electrically nonconductive cylinder 15 having concentrically positioned therein an electrically conductive tube 16. Cylinder 15 is about 0.450 inch in length and about 0.350 inch O.D. Tube 16 contains a specimen material 17 to be subjected to high pressures and high temperatures and may be of various metals, and non-metals for example, graphite, $Al_2O_3$, etc. A pair of electrically conductive disks 18 are concentrically positioned and close each end of cylinder 15 and tube 16. Reaction vessel 14 also includes a pair of end caps 19, each of which includes an electrically conductive metal ring 20 encircling a nonconductive stone disk 21.

Between each punch 11 and 11' and the die 12, there is included a gasket assembly 22 comprising a pair of thermally insulating and electrically nonconducting gaskets 23 and 24 and an intermediate metallic gasket 25. Suitable examples of materials from which these gaskets 23 and 24, cylinder 15 and disk 21 may be manufactured are various stones, ceramics, etc., for example, catlinite, talc and pyrophyllite.

Motion of one or both punches towards each other compresses the gasket assemblies and the reaction vessel to subject a specimen in tube 16 to high pressures while, at the same time, electrical current is provided from a source not shown to flow through the punches 11 and 11' and through the specimen and/or tube 16 to raise the temperature of the specimen. The foregoing description relates merely to one exemplary high pressure apparatus. Various other apparatuses are capable of providing the required pressures and temperatures that may be employed within the scope of this invention.

Pressures and temperatures in such a high pressure apparatus generally are determined by the use of a standard which entails the known pressure values of electrical transitions of certain metals, for example, cesium, barium, thallium and bismuth, as given by P. W. Bridgman, "Proceedings of the American Academy of Arts and Sciences," volume 81, No. 4, pages 165–251 (1952). Temperatures are determined by thermocouple elements within the reaction volume and extrapolated beyond the ranges of thermocouple materials. Reference is made in this respect to the aforementioned Hall Patent 2,941,248 and to a further Hall et al. Patent 2,947,610 relating to a process of growing diamonds from carbonaceous material. Each patent more particularly describes measurement of pressures and temperatures as employed in the present invention together with various methods of operating such high pressure high temperature apparatuses.

It has been discovered that boron carbide, $B_4C$, is an outstanding bonding medium for diamond compacts when it is subjected to high pressures and high temperatures together with diamond powder in high pressure high temperature apparatuses as described. Advantages over other bonding materials or matrixes to be gained are evident because $B_4C$ is next in hardness to diamond so that the bonding medium itself instead of being a weak solder or braze material, is a material which is very hard and much harder than cemented carbides. $B_4C$ is a known abrasive and grinding material in itself. The particular characteristics of the bonding effect of boron carbide and diamond is not clearly understood because there is no chemical evidence that boron carbide should be adhesive to or bond diamonds. However, results indicate that $B_4C$ is exceptionally adherent to diamond under high pressure high temperature conditions.

Because of the exceptional bonding characteristics of $B_4C$ with respect to diamond crystals, it was also employed to bond crystals of the cubic form of boron nitride which has been referred to as borazon. See U.S. Patent 2,947,617. $B_4C$ in this instance also provided excellent bonding, and the bonded crystals may be employed as abrading and cutting elements generally. $B_4C$ bonded cubic form of boron nitride crystals abraded steel without injurious effects. In the examples where both diamond and cubic form of boron nitride crystals were employed, the compacts obtained indicated mixtures of diamond and cubic form of boron nitride crystals may be provided in compact form.

Boron carbide as employed in the process of the present invention to provide compacts appears to have no critical features with respect to impurities. Commercial grades of boron carbide range from about 75%–80% boron to a high purity boron carbide of 99+% $B_4C$. A technical grade boron carbide may also be employed of about 67%–76% boron. Boron carbide is also commercially available in a wide range of mesh sizes.

In the preferred form and practice of this invention, better results are indicated where higher purity boron carbide is employed in the smaller particle size together with higher pressures and temperatures.

Examples setting forth specific practices of the teachings of this invention are as follows:

*Example 1*

A mixture of 85% by weight of 325 mesh diamond (less than 40 micron particle size) and 15% 600 mesh boron carbide was ball milled for about 3 hours. Tube 16 was graphite of about 0.125 inch O.D. and 0.10 inch I.D., and was filled with this mixture and subjected in the apparatus of FIG. 1 to a combination of about 1200° C. temperature and 35,000 atmospheres' pressure for about 30 minutes. After removal of these conditions, a tough, coherent compact was obtained from the reaction vessel.

*Example 2*

Example 1 was repeated at about 75,000 atmospheres and 1200° C. temperature for about 30 minutes. After removal of these conditions, a tough, coherent compact was obtained from the reaction vessel. It is to be noted that this example was performed in a pressure and temperature range which is in the diamond stable region, i.e., above the graphite to diamond equilibrium line established by combinations of pressure and temperature and known in the art.

In the following examples, carbon tube 16 was 0.120 inch O.D., about 0.080 inch I.D. and about 0.450 inch long. $B_4C$ was 400 mesh and diamond and borazon between about 60–325 mesh. Sample material was evenly divided so that diamond and $B_4C$ occupied one-half the length of tube 16 and cubic form of boron nitride and $B_4C$ occupied the remaining half. Tube contents were hand tamped for packing.

*Example 3*

Tube 16 was filled as described together with $B_4C$ 5% by volume or 4% by weight of the contents. Pressure and temperature were raised to 91,000 atmospheres and 1700° C. and maintained about 6 minutes. Several disks of bonded diamond and bonded borazon were recovered.

*Example 4*

Tube 16 was filled as described together with 25% $B_4C$ by volume or 18% by weight of the contents. Pressure and temperature were raised to 76,000 atmospheres and 1500° C. and maintained for about 16 minutes. The diamond crystals were rather poorly bonded but the borazon crystals were very well cemented or bonded.

*Example 5*

Tube 16 was filled as described together with 10% $B_4C$ by volume or 7% by weight of the contents. Pressure and temperature were raised to 76,000 atmospheres and 1500° C. and maintained for about 10 minutes. Diamonds were well bonded in the cooler portions of the tube. Borazon crystals were well bonded in all portions.

*Example 6*

Tube 16 was filled as described together with 15% $B_4C$ by volume or 11% by weight of the contents. Pressure and temperature were raised to 50,000 atmospheres and 1300° C. and maintained about 8 minutes. Both diamonds and borazon were cemented or bonded providing good compacts of each.

*Example 7*

Tube 16 was filled as described together with 15% $B_4C$ by volume or 11% by weight of contents. Pressure and temperature were raised to 15,000 atmospheres and 1050° C. and maintained 4 minutes. Rather weak compacts (for metal abrading) were obtained.

*Example 8*

Example 7 was repeated at 1200° C. for a time period of 6 minutes. Bonding was better than that of Example 7.

Bonding appears to be generally better at higher pressures and temperatures because of better contact between particles and lesser tendency to graphitize diamond. A preferred minimum pressure for average use compacts is about 35,000 atmospheres.

A compact produced by this invention has been employed generally as a diamond tool. FIG. 2 illustrates a basic tool 26 of this type and includes a support member or holder 27 having a compact 28 positioned therein. Various methods and means may be employed to securely fix compact 28 in its illustrated or other positions. One suitable bonding process is described in U.S. Patent 2,570,428, Kelley, and utilized layers of solder and titanium hydride. Mechanical joints also may be employed and the compact oriented in holder 27 in various arrangements depending on compact configuration. Support 27 is deemed generic to various tools, such as, cutters, grinders, wheels, saws, etc.

Accordingly, this invention provides, by the teachings thereof, a tough, coherent diamond or cubic form of boron nitride compact which includes a plurality of crystals or particles securely bonded together through the medium of boron carbide and which compact may be utilized in general cutting and grinding implements. Diamond compact is obtained both in and out of the diamond stable region according to the phase diagram of carbon, but the temperature must not be so high as to cause conversion of the diamond to graphite. Range of added $B_4C$ has been found to be preferably between 5 and 25%. It is, of course, understood that other materials, for example, metals, may be employed in addition to $B_4C$.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. A tough, coherent, hard abrasive compact consisting of a plurality of crystals of at least one material chosen from the group consisting of diamond and the cubic form of boron nitride, and a bonding medium therefor; said bonding medium consisting essentially of boron carbide and being present in a quantity ranging from a small amount up to about 25% by volume of the compact, said small amount being an amount effective for bonding said crystals.

2. The tough, coherent, hard abrasive compact as recited in claim 1 wherein the crystals are diamond.

3. The invention as recited in claim 1 wherein the crystals are of the cubic form of boron nitride.

References Cited in the file of this patent
UNITED STATES PATENTS

| | | |
|---|---|---|
| 2,391,589 | Nussbaum | Dec. 25, 1945 |
| 2,609,285 | Thomas | Sept. 2, 1952 |
| 2,636,825 | Nicholson | Apr. 28, 1953 |
| 2,887,393 | Taylor | May 19, 1959 |
| 2,888,355 | Taylor | May 26, 1959 |
| 2,947,610 | Hall et al. | Aug. 2, 1960 |